United States Patent [19]

Stuart

[11] 4,337,429
[45] Jun. 29, 1982

[54] A.C. MOTOR CONTROL CIRCUIT
[75] Inventor: Thomas A. Stuart, Maumee, Ohio
[73] Assignee: The University of Toledo, Toledo, Ohio
[21] Appl. No.: 184,107
[22] Filed: Sep. 4, 1980
[51] Int. Cl.³ .............................................. H02P 5/34
[52] U.S. Cl. .................................................. 318/811
[58] Field of Search ............................... 318/798–803, 318/810, 811, 812

[56] References Cited
U.S. PATENT DOCUMENTS 4,189,669  2/1980  van Loon et al. .................. 318/811
4,290,001  9/1981  Espelage ............................ 318/811

*Primary Examiner*—Gene Z. Rubinson
*Attorney, Agent, or Firm*—Wilson, Fraser, Barker & Clemens

[57] ABSTRACT

A microprocessor based A.C. motor control circuit which can be used for both open and closed loop control includes a pair of RAMs for storing separate groups of synchronized digital waveforms for driving an A.C. motor. The microprocessor is used to calculate the group of digital waveforms required to maintain a controlled motor parameter at a desired value. One RAM has an output connected to supply the group of digital waveforms stored therein to a motor driver, while the second RAM is connected to receive a new group of digital waveforms which have just been calculated by the microprocessor. Once the new group of waveforms have been loaded into the second RAM, the microprocessor generates control signals to disconnect the output of the first RAM from the motor driver, and to connect the output of the second RAM to supply the newly calculated digital waveforms to the motor driver. The first RAM is then connected to receive the next group of digital waveforms to be calculated by the microprocessor.

20 Claims, 4 Drawing Figures

A.C. MOTOR CONTROL CIRCUIT

BACKGROUND OF THE INVENTION

The use of microprocessors in the control of electric motors offer several advantages over traditional analog controllers. Probably the single most important advantage is the ability of the microprocessor to perform signal processing functions which previously required relatively complex analog circuitry. Moreover, a microprocessor based control system can be adapted to control different motors merely by reprogramming the microprocessor, without the need for extensive hardware modifications.

Microprocessor based A.C. motor control systems typically generate a group of PWM (pulse - width - modulated) waveforms for switching a group of motor driver switching elements (typically either thyristors or power transistors) to produce the motor driving waveforms. The number of PWM waveforms required depends on the number of phases supplied to the motor and the type of switching elements in the motor driver. In some instances, it is desirable to suppress certain harmonics in the PWM waveform to militate against undesirable effects on the motor. For example, in the control of three phase motors, multiples of the third harmonic (3rd, 6th, 9th, etc.) are often eliminated to reduce the heat generated by the motor.

SUMMARY OF THE INVENTION

The present invention provides an A.C. motor control circuit which is capable of generating and updating a relatively complex set of synchronized PWM digital waveforms for driving an A.C. motor. The control circuit includes a central control means such as a microprocessor for calculating the group of digital waveforms required to maintain a controlled motor parameter at its desired value. For example, in an open loop control system, the microprocessor can control the motor driving signal frequency and the output voltage in order to maintain a constant torque over a wide speed range. Moreover, the digital waveforms can be calculated such that undesirable harmonics are reduced or eliminated. The present invention can also be adapted for use with a closed loop control system.

In accordance with the present invention, the control circuit utilizes two separate memory storage units, such as two individual RAM units. One of the RAMs is utilized to store and output the group of digital waveforms stored therein to a motor driver, while the second RAM is connected to receive and store a new set of digital waveforms which have just been calculated by the microprocessor. After the new set of waveforms have been loaded into the second RAM, the microprocessor will generate control signals to connect the second RAM to supply the new set of waveforms to the motor driver and connect the first RAM to receive the next set of waveforms calculated by the microprocessor.

The RAM whose output is connected to supply the digital waveforms to the motor driver receives address signals from an output of a counter which is incremented at a rate directly proportional to the motor drive frequency. The address signals sequentially address a predetermined number of memory locations in the RAM to generate the PWM waveforms on the output lines of the RAM. The address signals are supplied to the RAM through a multiplexer which controls which one of the two RAMs is to receive the address signals. A second multiplexer is used to route the output of the particular RAM receiving the counter generated address signals to the motor driver.

DESCRIPTION OF THE PREFERRED EMBODIMENT

Figure 1:
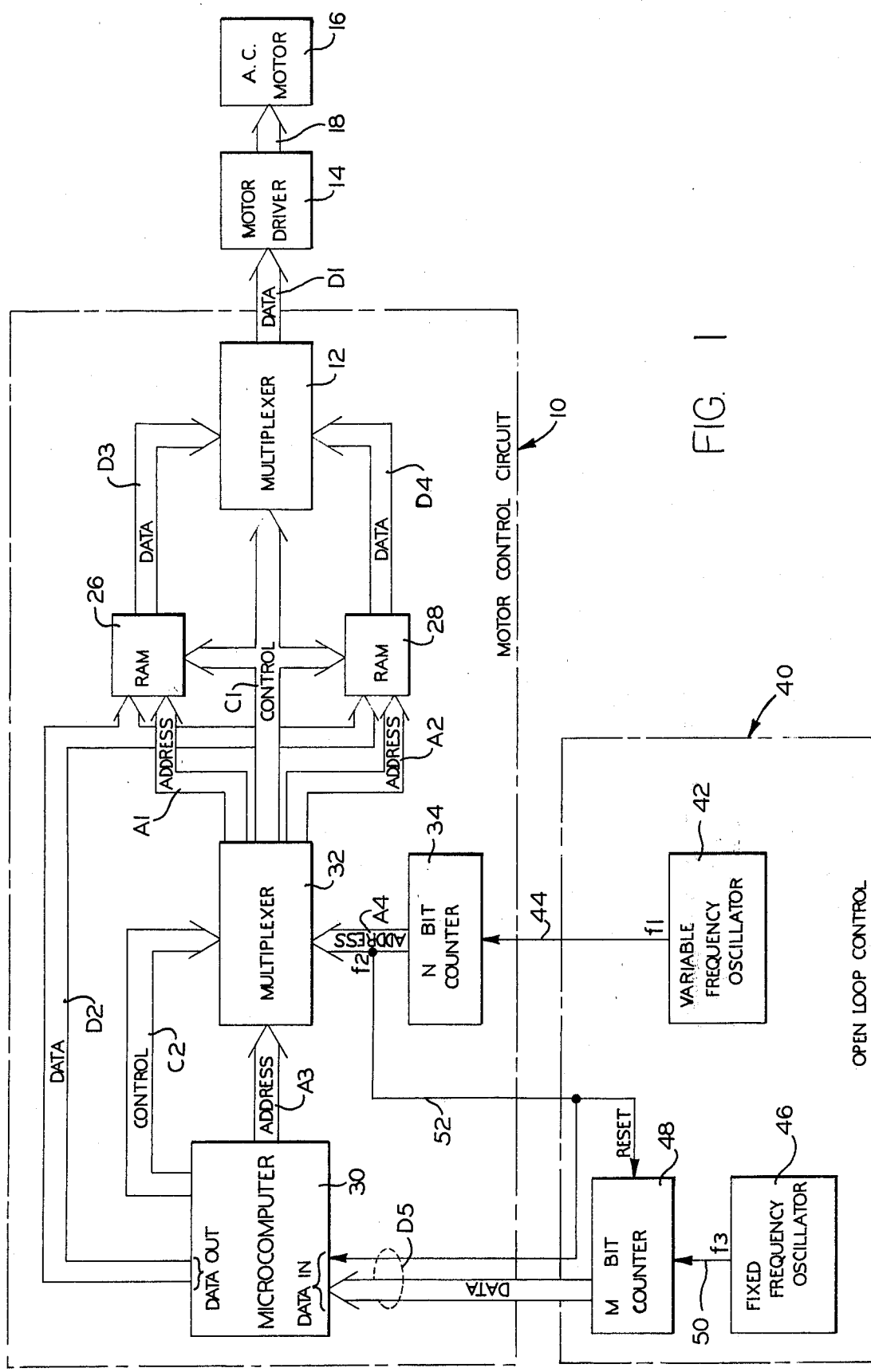
FIG. 1 is a block diagram of a motor control circuit according to the present invention adapted for open loop control.

There is shown in FIG. 1 a block diagram of an A.C. motor control circuit 10 according to the present invention. Although the circuit shown in FIG. 1 is adapted for open loop control, the circuit 10 can also be used in a closed loop system, as will be discussed hereinafter.

Basically, the control circuit 10 functions to generate a set of synchronized digital waveforms, at the output of a multiplexer 12, which are supplied to a motor driver 14 on a data bus D1. The motor driver 14 supplies driving signals to an A.C. motor 16 on lines 18. The digital waveforms on the data bus D1 are generated in a manner to maintain a controlled parameter of the motor 16 at a desired value.

Figure 2:
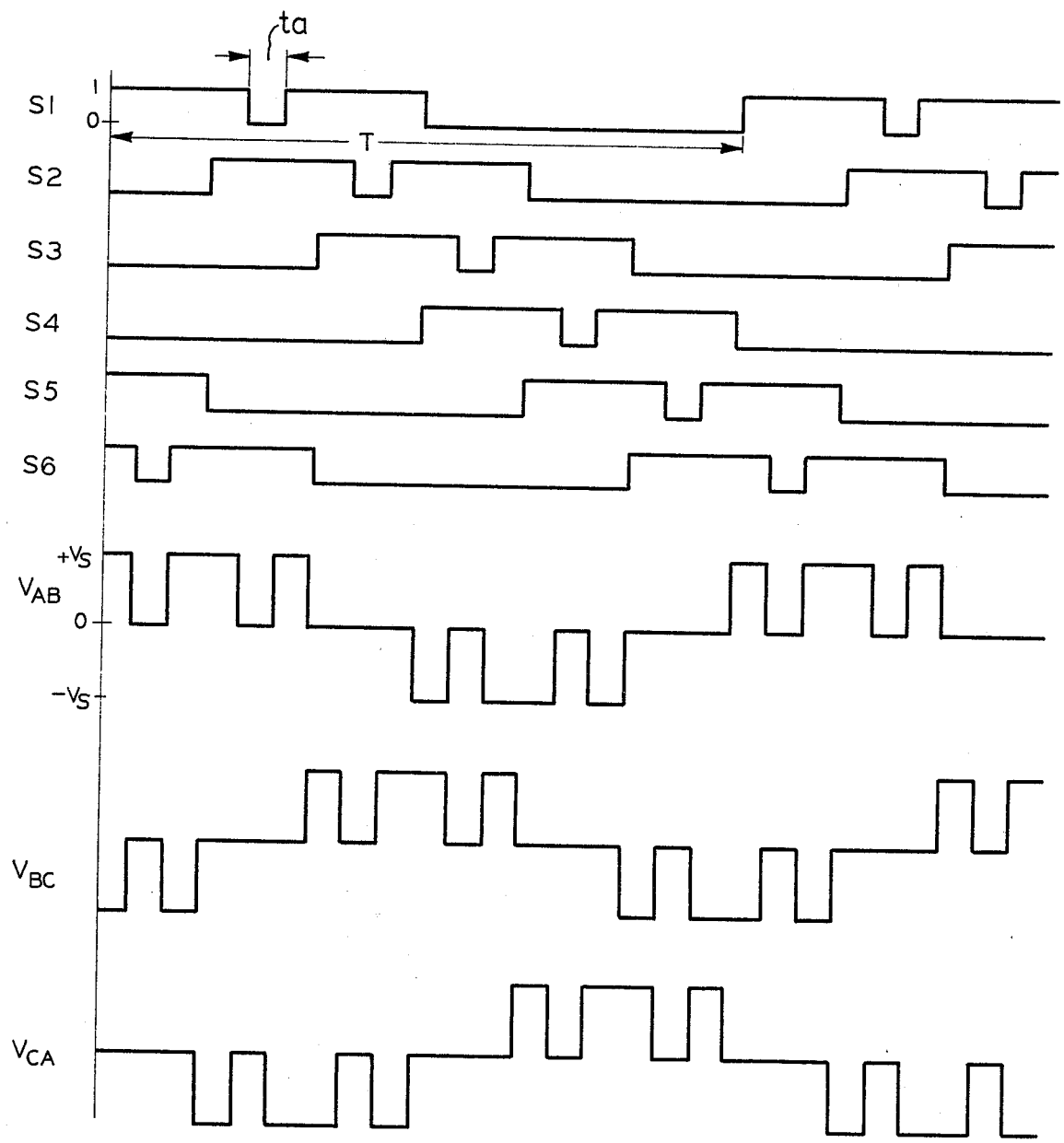
FIG. 2 is a waveform diagram illustrating a group of six digital waveforms for controlling a three phase transistor-type motor driver, along with the three driving waveforms applied across the input terminals of a three phase A.C. motor, which waveforms can be generated by the circuit of FIG. 1.
Figure 3:
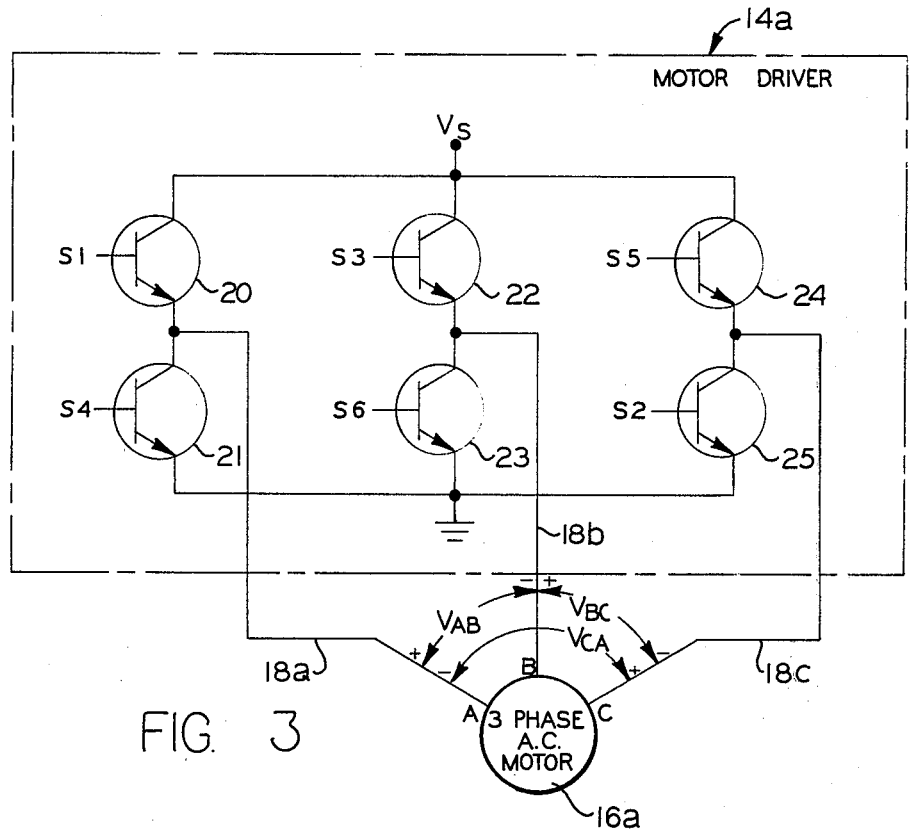
FIG. 3 is a schematic diagram of a motor driver and associated three phase motor which can be driven by the waveforms shown in FIG. 2.

An example of a group of synchronized digital waveforms which can be used to control a three phase A.C. motor are shown in FIG. 2 as waveforms S1 through S6. These waveforms can be used to control a motor driver of the type illustrated in FIG. 3. In FIG. 3, a motor driver 14a receives the digital waveforms S1 through S6 and supplies driving signals to a three phase A.C. motor 16a on lines 18a, 18b, and 18c.

The motor driver 14a of FIG. 3 is a transistor inverter-type and includes six power transistors, 20 through 25, each of which has a base connected to receive a separate one of the digital waveforms S1 through S6. The transistors 20 through 25 are connected in pairs between a Vs power supply and a ground potential. Each pair of transistors is connected to supply a separate one of the three driving signals required to drive the three phase A.C. motor 16a. The waveforms S1 through S6 selectively switch the transistors 20 through 25 on and off to produce the driving wave-$V_{AB}$, $v_{BC}$, and $V_{AC}$, (shown in FIG. 2) which are applied across pairs of the A, B and C input terminals of the motor 16a. It should be noted that the digital waveforms of FIG. 2 result in motor drive signals in which multiples of the third harmonic have been eliminated to reduce heating in the motor. In some instances, it may be desirous to generate more complex waveforms in which additional harmonics are reduced.

The motor control circuit 10 functions to calculate and generate the group of digital waveforms which maintain a controlled motor parameter at its desired value. For example, if it is desired to maintain a constant motor torque, the control circuit 10 can vary the gap width $t_a$ (shown in waveform S1 of FIG. 2) and the period T of the digital waveforms S1 to S6 to simultaneously control the output voltage and frequency of the driving signals to the motor 16a in such a manner that the motor produces a constant torque over a wide speed range.

The number of digital waveforms generated on the data bus D1 is determined by the type of motor driver 14 and the type of A.C. motor 16 which are to be controlled. For example, when a three phase A.C. motor is driven by a transistor inverter-type motor driver as shown in FIG. 3, typically a set of six synchronized digital waveforms will be required. On the other hand, if a three phase A.C. motor is driven by a more common thyristor inverter-type motor driver, which typically includes twelve thyristor switching elements, a set of twelve synchronized digital waveforms will be required.

In accordance with the present invention, the control circuit 10 includes two separate memory storage units, RAMs 26 and 28, which are utilized for storing the digital waveforms required to drive the motor driver 14. The RAMs 26 and 28 are connected to receive data on a data bus D2 from a microcomputer 30 and control signals on a control bus C1 from a multiplexer 32. The RAMs 26 and 28 receive address signals on address busses A1 and A2 respectively from the multiplexer 32. The outputs of the RAMs 26 and 28 are supplied to the muliplexer 12 on data busses D3 and D4 respectively. As will be discussed, one RAM is connected to output the digital waveforms stored therein to the motor driver 14, while the other RAM is connected to receive a new set of digital waveforms which have just been calculated by the microcomputer 30.

The main controller of the circuit 10 is the microcomputer 30. The microcomputer 30 is utilized to calculate the digital waveforms required to maintain the controlled motor parameter at its desired value. The microcomputer generates address signals on an address bus A3 and control signals on a control bus C2 to the multiplexer 32. The output data of the microcomputer 30 is generated on the data bus D2, while incoming data is received on a data bus D5.

The multiplexer 32 is used to route the address signals on the bus A3 to either the address bus A1 or the address bus A2. The multiplexer 32 also supplies a portion of the control signals on the bus C2 to the control bus C1 for controlling the operations of the RAMs 26 and 28 and the multiplexer 12.

An N bit counter 34 generates address signals on an address bus A4 which are supplied through the multiplexer 32 to either RAM 26 or RAM 28. The number N of address lines on the bus A4 is related to the number of memory locations in each of RAMs 26 and 28 which are required to store the complete set of digital waveforms. Typically, the number of bits in each word or memory location in the RAM corresponds to the number of digital waveforms required to drive the motor driver 14. For example, if six digital waveforms are required to control the motor driver 14, the RAMs can store 6-bit words. Each bit of each word is used to store a particular portion of each digital waveform. For example, location one of RAM 26 has a first bit corresponding to a first digital waveform, a second bit corresponding to a second digital waveform, up through the last bit which corresponds to the last digital waveform. Typically, the waveforms are stored in the RAMs in a sequential manner. The number of memory locations required to store the waveforms is $2^N$, where N is the number of bits in the counter 34. For example, an eight bit counter can be used to address a RAM having memory locations for $2^8$ or 256 words. As will be discussed, the counter is incremented at rate directly proportional to the motor drive frequency. By addressing each memory location in a timed, sequential manner, the stored digital waveforms are generated on the output data lines of the respective RAM where they can be supplied to the motor driver 14 through the multiplexer 12.

As previously mentioned, the control circuit of FIG. 1 operates in an open loop mode. An open loop control 40 includes a variable frequency oscillator 42 which functions as a speed control by generating a signal on a line 44 at a frequency $f_1$ which is directly proportional to the motor drive frequency $f_2$. More specifically, $f_1 = f_2 \cdot 2^N$. The line 44 is connected to supply the $f_1$ signal to the clock input of the N bit counter 34.

The open loop control 40 also includes a fixed frequency oscillator 46 for generating a signal at a relatively high frequency $f_3$ on a line 50 to a clock input of an M bit counter 48. The counter 48 is connected to receive a reset signal on a line 52 connected to the highest order bit of the output of the counter 34. The pulses on the line 52 are generated at the motor drive frequency $f_2$. The output of the counter 48 and the line 52 are connected to the microcomputer 30 as incoming data bus D5.

The counter 48 functions to count the number of pulses on the line 50 which occur between pulses on the line 52. Each time a pulse is generated on the line 52, the counter 48 may be read by the microcomputer 30 before being reset. Since the value of the frequency $f_3$ is fixed, the count read by the microcomputer represents the elapsed time between the motor frequency drive pulses on the line 52. The microcomputer then decodes this count to determine the motor drive frequency $f_2$. Based on this count, the microcomputer can determine the digital waveforms required to drive the A.C. motor.

Figure 4:
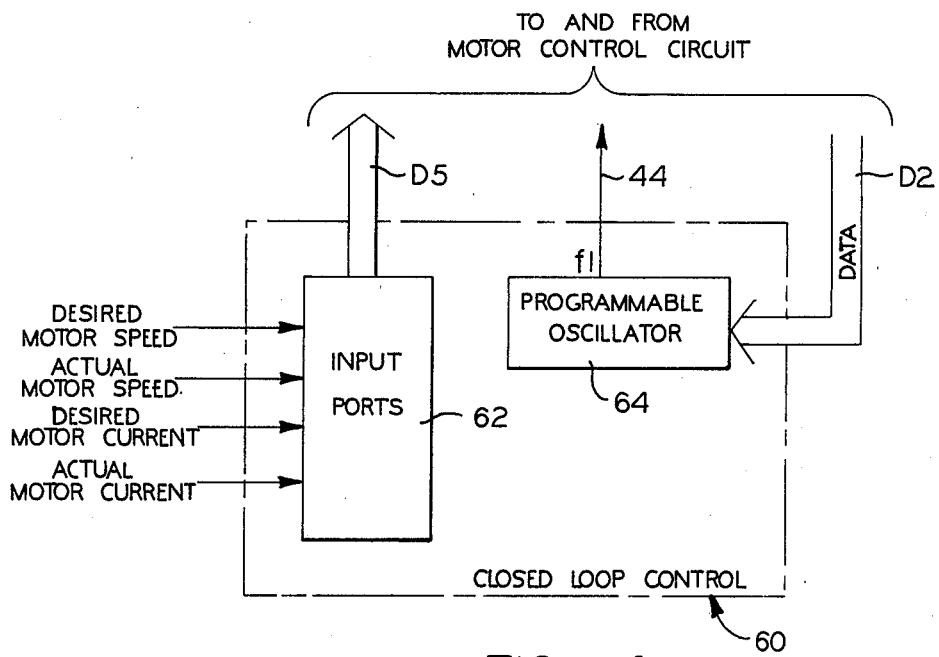
FIG. 4 is a block diagram of a closed loop control which can be used with the motor control circuit of FIG. 1.

As previously mentioned, the present invention can also be adapted for use in a closed loop control system. There is shown in FIG. 4 a closed loop control 60 which replaces the open loop control 40 of FIG. 1. The closed loop control includes input ports 62 for receiving feedback signals such as an ACTUAL MOTOR SPEED signal and an ACTUAL MOTOR CURRENT signal. The input ports also receive control signals such as a DESIRED MOTOR SPEED signal and a DESIRED MOTOR CURRENT signal. The input ports 62 have outputs connected to the data bus D5 to permit the microcomputer 30 to selectively read the value of each signal supplied to the input ports 62.

The microcomputer 30 compares the desired and actual signal values and calculates the digital waveforms required to maintain the sensed motor parameters at their desired values. The microcomputer also calculates the desired motor drive frequency and generates signals on the data bus D2 to a programmable oscillator 64 to set the oscillator output frequency on the line 44 at the frequency $f_1$. As previously mentioned the frequency $f_1$ divided by $2^N$ equals the desired motor drive frequency $f_2$.

The control circuit 10 operates in a similar manner in both the open and closed loop version. In both versions, one of the RAMs 26 and 28 is connected to generate the group of waveforms stored therein to the motor driver 14 on the data bus D1, while the other RAM is connected to receive a new group of digital waveforms which have just been calculated by the microcomputer. For example, if RAM 26 contains the digital waveforms which are to be supplied to the motor driver 14, the microcomputer generates control signals on the control bus C2 to the multiplexer 32 to cause the multiplexer to route the address signal on the bus A4 to the bus A1 and then to the RAM 26. The address signals on the bus A1 will sequentially address $2^N$ memory locations in the RAM 26 to produce the group of digital waveforms on the RAM output data bus D3. The multiplexer 12 receives control signals from the bus C1 to route the waveforms on the bus D3 to the motor driver 14 on the bus D1. The N bit counter 34 will continue to be incremented at a rate proportional to the desired motor drive frequency.

While the RAM 26 outputs the digital waveforms on the data bus D3, the RAM 28 is connected to receive a new group of digital waveforms which have just been calculated by the microcomputer 30. The multiplexer 32 will route the A3 address signals to the address bus A2 to permit the microcomputer to load the new group of waveforms into the RAM 28 via the data bus D2. Once the new waveforms have been loaded into the RAM 28, the microcomputer generates control signals through the multiplexer 32 to the control bus C1 to cause the multiplexer 12 to disconnect the data bus D3 from the bus D1 and to connect the data bus D4 to the bus D1. The multiplexer 32 will now supply the A4 address signals to the bus A2 such that the RAM 28 generates the new group of digital waveforms to the motor driver 14. The RAM 26 is then connected to receive the next group of digital waveforms to be calculated by the microcomputer 30.

The use of two separate storage devices enables the motor control circuit to calculate relatively complex waveforms while the motor driver continues to receive driving signals. Once the waveforms have been calculated and loaded into one of the RAMs, the multiplexer 12 will supply the newly calculated waveforms to the motor driver 14. This system provides a response time which is well within the requirements of most A.C. motors.

In accordance with the provisions of the patent statutes, I have explained the principle and mode of operation of my invention and have illustrated and described what I now consider to represent the best embodiment. However, I desire to have it understood that within the scope of the appended claims, the invention may be practiced otherwise than as specifically illustrated and described.

What is claimed is:

1. A control circuit for generating a plurality of driving signals to an electric motor driver to control the application of electric power to an A.C. electric motor, comprising:
   means for generating successive groups of the driving signals:
   a first storage means for said groups of the driving signals;
   a second storage means for said groups of the driving signals; and
   a control means for alternately connecting one of said first and second storage means to said means for generating the driving signals to load one of said groups of the driving signals into storage and connecting the other one of said first and second storage means to the motor driver to generate another one of said groups of the driving signals to the motor driver, whereby said one of said first and second storage means is connected to generate a group of the driving signals to the motor driver while said other one of said first and second storage means is being loaded with a subsequent group of the driving signals.

2. A control circuit according to claim 1 wherein said control means includes means for generating first and second pluralities of address signals and a first multiplexer means for supplying said first plurality of address signals to said one of said first and second storage means to load said one of said groups of driving signals and for supplying said second plurality of address signals to said other one of said first and second storage means to generate said another one of said groups of driving signals to the motor driver.

3. A control circuit according to claim 1 wherein said means for generating successive groups of the driving signals includes means for generating a first plurality of address signals, said one of said first and second storage means being responsive to said first plurality of address signals for loading said one of said groups of the driving signals into storage.

4. A control circuit according to claim 3 wherein said control means includes means for generating a second plurality of address signals, said other one of said first and second storage means being responsive to said second plurality of address signals for generating said another one of said group of the driving signals to the motor driver.

5. A control circuit according to claim 4 wherein said control means includes a first multiplexer means connected between said first and second means for generating address signals and said first and second storage means for supplying said first plurality of address signals to said one of said first and second storage means and for supplying said second plurality of address signals to said other one of said first and second storage means.

6. A control circuit according to claim 2 or 5 wherein said control means includes a second multiplexer means for connecting said other one of said first and second storage means receiving said second plurality of address signals to the motor driver.

7. A control circuit according to claim 4 wherein said means for generating said second plurality of address signals includes a binary counter having a plurality of outputs connected to said other one of said first and second storage means.

8. A control circuit according to claim 7 including a variable frequency oscillator for generating a clock signal at a frequency directly proportional to a desired motor drive frequency, said binary counter being responsive to said clock signal for generating said second plurality of address signals.

9. A control circuit according to claim 8 including means responsive to said clock signal for generating a signal representing said desired motor speed and wherein said means for generating successive groups of driving signals includes a microcomputer responsive to said desired motor speed signal for calculating said successive groups of driving signals.

10. A control circuit according to claim 7 including a programmable oscillator responsive to a programming signal for generating a clock signal at a programmed frequency, said binary counter being responsive to said clock signal for generating said second plurality of address signals.

11. A control circuit according to claim 10 wherein said means for generating successive groups of driving signals includes a microcomputer, said microcomputer being responsive to a source of data representing at least one motor parameter for calculating said successive groups of driving signals and the programmed frequency, said microcomputer being connected to generate said programming signal to said oscillator.

12. A control circuit according to claim 1 wherein said means for generating said successive groups of the driving signals includes a microcomputer.

13. A control circuit according to claim 12 wherein said microcomputer is responsive to a source of data representing at least one motor parameter for calculating said successive groups of the driving signals.

14. A control circuit according to claim 13 wherein said data includes a signal representing a desired motor speed.

15. A control circuit according to claim 14 wherein said data includes a signal representing an actual motor speed.

16. A control circuit according to claim 13 wherein said data includes signals representing a desired motor current and an actual motor current.

17. A control circuit according to claim 1 wherein said first and second storage means include random access memories.

18. A control circuit for generating a cyclic driving signal to a motor driver to control the application of electric power to an A.C. motor, comprising:
   means for generating a series of data signals representing the cyclic driving signal;
   storage means having first and second memory means for said data signals; and
   a control means for alternately connecting one of said first and second memory means to said means for generating to load one of said data signals into storage and connecting the other one of said first and second memory means to the motor driver to generate another one of said data signals to the motor driver, whereby said storage means generates succussive ones of said data signals to the motor driver as the cyclic driving signal.

19. A control circuit according to claim 18 wherein said means for generating generates each of said data signals as a predetermined number of data bits representing a predetermined portion of the cyclic driving signal.

20. A control circuit according to claim 18 wherein said means for generating generates each of said data signals as a series of a predetermined number of multi-bit words representing a predetermined portion of the cyclic driving signals.

* * * * *